United States Patent [19]
Kroniger

[11] Patent Number: 4,799,575
[45] Date of Patent: Jan. 24, 1989

[54] HYDRAULICALLY CONTROLLED DISK BRAKE WITH SERIAL FLUID FLOW

[75] Inventor: Wilhelm Kroniger, Friolzheim, Fed. Rep. of Germany

[73] Assignee: Dr. Ing. h.c.F. Porsche Aktiengesellschaft, Stuttgart, Fed. Rep. of Germany

[21] Appl. No.: 116,154

[22] Filed: Nov. 3, 1987

[30] Foreign Application Priority Data

Nov. 24, 1986 [DE] Fed. Rep. of Germany ....... 3640056

[51] Int. Cl.⁴ ..................... F16D 55/02; F16D 65/14; F16D 65/78
[52] U.S. Cl. .................................. 188/71.6; 188/72.4; 188/106 P; 188/264 F
[58] Field of Search ................... 188/71.6, 72.1, 72.4, 188/73.47, 151 R, 152, 106 F, 106 P, 361, 370, 264 F, 72.5; 303/116

[56] References Cited

U.S. PATENT DOCUMENTS 2,805,737  9/1957  Griffin ............................ 188/152
3,420,342  1/1969  Botterill ......................... 188/264 F
3,487,896  1/1970  Becker et al. .................... 188/152
4,014,410  3/1977  Bryant ........................ 188/264 F X
4,278,300  7/1981  Bacher ........................... 303/116 X

FOREIGN PATENT DOCUMENTS 1095065  12/1960  Fed. Rep. of Germany ..... 188/72.5
1284724  12/1968  Fed. Rep. of Germany .
1001791  10/1951  France ............................ 188/264 F Primary Examiner—Andres Kashnikow
Assistant Examiner—Robert J. Oberleitner
Attorney, Agent, or Firm—Barnes & Thornburg

[57] ABSTRACT

A hydraulically controlled disk brake of a motor vehicle having at least one hydraulically actuable brake piston that is arranged in a caliper and is guided in at least one cylinder. The brake has a duct which continuously serially connects the cylinders in each half of the caliper, this duct having separate inlet and outlet openings. A check valve for each inlet and outlet opening is respectively arranged in front of the first cylinder after the inlet opening and behind the last cylinder before the outlet opening with respect to flow direction.

10 Claims, 4 Drawing Sheets

HYDRAULICALLY CONTROLLED DISK BRAKE WITH SERIAL FLUID FLOW

BACKGROUND AND SUMMARY OF THE INVENTION

The present invention relates to a hydraulically controlled disk brake of a motor vehicle having at least one hydraulically actuable brake piston that is arranged in a caliper and is guided in at least one cylinder. Published Examined patent application No. 1,284,724 which comprises brake pistons that are arranged in a caliper and are guided in cylinders. The cylinders of the brake pistons are connected with one another via a ring duct. This disk brake is equipped with two brake pistons that are located opposite to one another in the caliper, and the connecting ring duct is constructed so that a joint inlet and outlet opening is created that is arranged centrically with respect to a piston. Via the check valves that are each arranged in the ring duct in the area of the connection of the two U-shaped caliper halves so that they are offset by 90° with respect to the piston, a supplying and removing of brake fluid takes place when the disk brake is actuated. In this type of design, when the brake is released, only an insufficient exchange of brake fluid is possible within the caliper because an exchange takes place mainly within the duct between the cover and flange side of the caliper. When the brake is released, a part of the ejected brake fluid of the rear brake cylinder in the inner ring duct is carried along to the outlet opening, whereas another part remains in the area of the front brake cylinder so that, during a braking process that follows, the same, only slightly cooled brake fluid will act upon the pistons. In this disk brake, therefore, no complete exchange of brake fluid takes place, particularly no exchange of the brake fluid of the rear cylinder that exists away from the outlet opening, and thus also no effective cooling can take place.

It is an objective of the present invention to provide a disk brake with such a circulation and exchange of brake fluid when the brakes are actuated that excessive heating and thus a gas formation is avoided.

These and other objectives are achieved in a hydraulically controlled disk brake having a plurality of hydraulically actuable brake pistons that are arranged in a caliper and are guided in respective cylinders, by providing duct means for continuously serially connecting the cylinders in each half of the caliper, these duct means having separate outlet and inlet openings. The check valves for each inlet and outlet opening are respectively arranged in front of the first cylinder after the inlet opening and behind the last cylinder before the outlet opening with respect to flow direction.

The main advantages that are achieved by means of the invention are that a complete circulation of fluid takes place, and the fluid that is heated during the braking in the spaces of the cylinders is exchanged so that a formation of gas bubbles is counteracted.

In particular, the inner duct that connects the cylinders behind one another has an outlet opening that is separate from the inlet opening so that already at this point, a physical separation takes place of warm and cold brake fluid. In addition, the duct is designed in such a way that the volume of the brake fluid that is present in the cylinders during braking, when the brake is released, is pushed out completely via the outlet opening, and when braking takes place again, only cold brake fluid can be fed to the duct via the inlet opening.

The directly adjacent assignment of the openings to the respective cylinders in the caliper has the advantage of a short duct length, and thus a fast exchange of the fluid is ensured. An optimized supplying and removing of brake fluid into and out of the cylinder spaces is promoted by the duct inlet and outlet into the area of the largest cross-section of the cylinder, in certain preferred embodiments.

In certain preferred embodiments, the outlet pipe that branches off the supply pipe, is located with its mouth in front of the inlet check valve as seen in flow direction of the brake fluid during braking, and provides the possibility of an admixing of the ejected heated brake fluid to the newly supplied cold brake fluid.

An opposed flow direction through the cylinders of each side is provided in certain preferred embodiments, although other embodiments have the same flow direction through the cylinders. In those embodiments, improved ventilating conditions must be provided.

The duct in the caliper may have an inlet opening that is located at any arbitrary point. For example, in certain preferred embodiments, the inlet opening is arranged between the cylinders of one half of the caliper. In certain further preferred embodiments, the valves are arranged rigidly outside the caliper or also inside the caliper.

Although in the drawings, disk brakes are shown that each have two pistons in each half, the duct design and its guiding can also be used for disk brakes with less than two pistons and more than two pistons per half of the caliper.

Other objects, advantages and novel features of the present invention will become apparent from the following detailed description of the invention when considered in conjunction with the accompanying drawings.

DETAILED DESCRIPTION OF THE DRAWINGS

Figure 1:
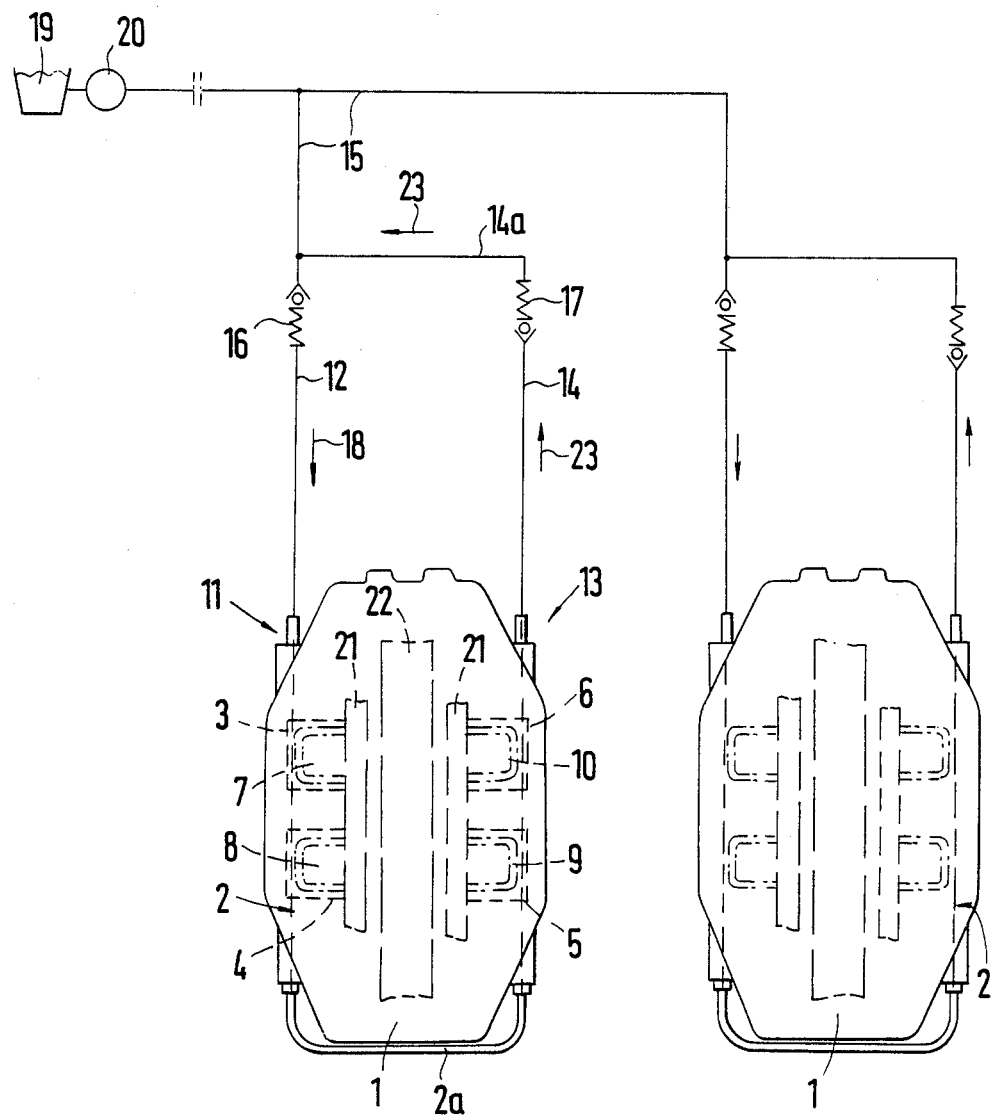
FIG. 1 is a diagrammatic representation of a course of a duct with supply and removal pipes in a brake caliper for two motor vehicle wheels, constructed in accordance with a preferred embodiment of the present invention.
Figure 2:
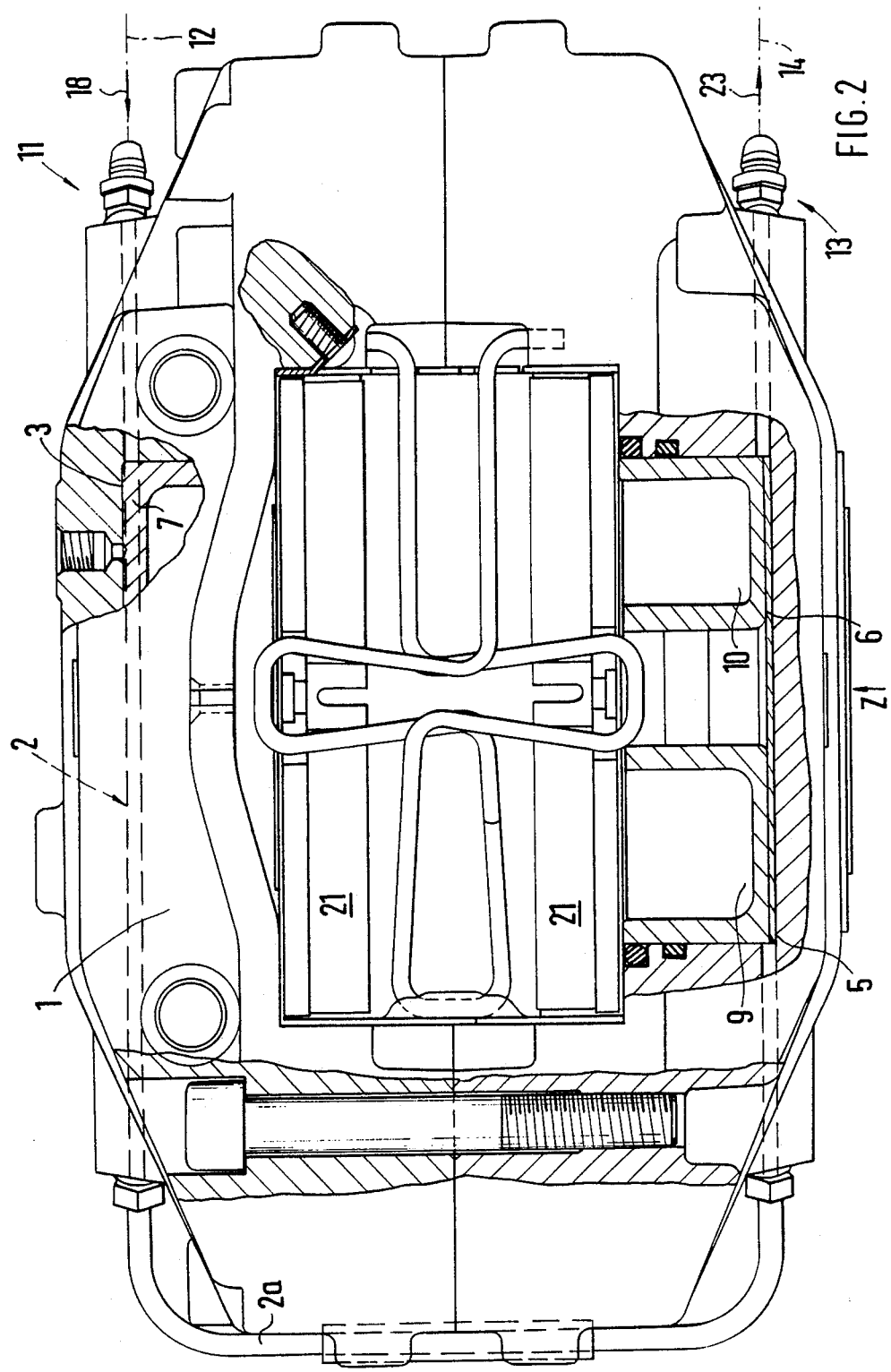
FIG. 2 is a partial horizontal sectional representation of one of the calipers of FIG. 1.

In FIG. 1, calipers 1 are shown for a left and a right wheel of a motor vehicle with an interior duct 2 for the guiding-through of brake fluid that connects the cylinders 3-6 for the brake pistons 7-10.

In the caliper 1 of the disk brake, in each half, two brake pistons 7, 8 and 9, 10 are arranged in the cylinders 3, 4 and 5, 6 that are disposed opposite one another. The duct 2 continuously connects these cylinders with one another. Between the rear cylinders 4 and 5, an exterior U-shaped connecting pipe 2a is provided that contributes to the cooling of the medium. Close to the first cylinder 3, an inlet opening 11 for a supply pipe 12 is provided and close to the fourth cylinder 6, another opening 13 for an outlet pipe 14 is provided. These two openings 11 and 13 are arranged in the brake caliper 1 separately from one another.

Figure 3:
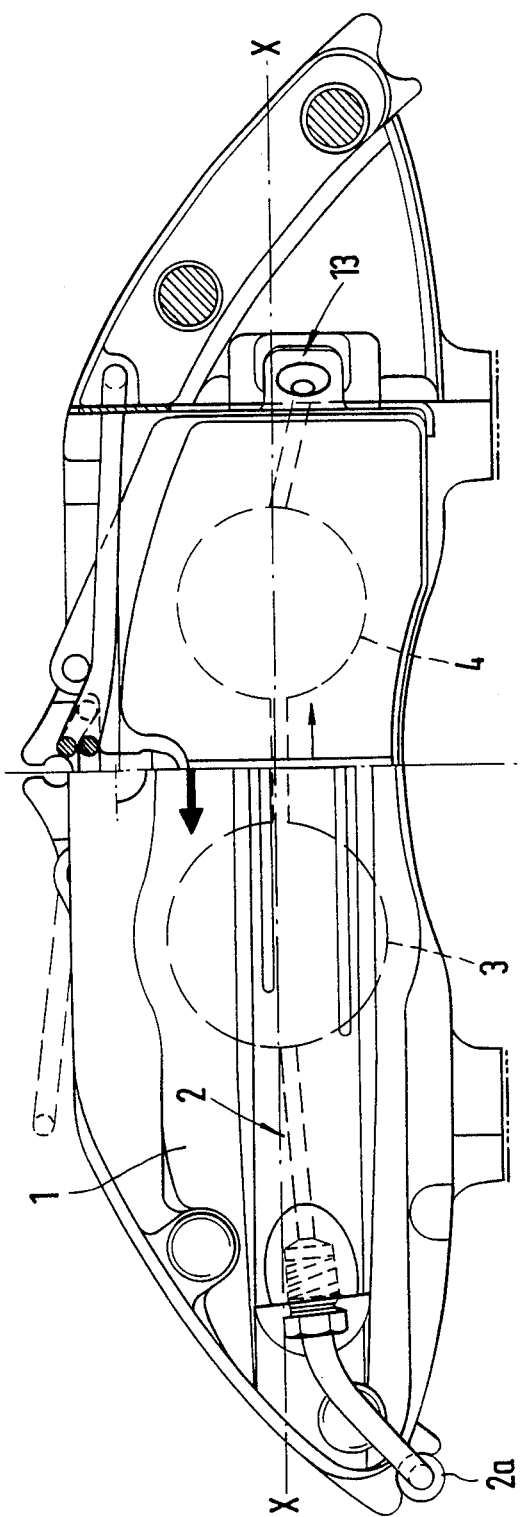
FIG. 3 is a lateral view of the brake in the direction of the Arrow Z of FIG. 2.

The duct 2 that extends on the inside of the caliper 1 is preferably arranged in a horizontal plane X—X (FIG. 3) that 15 extends through the central plane of the pistons 7-10, but because of constructional conditions, as shown in FIG. 3, a slight rising and declining of the end portions of the duct 2 may occur.

At the same time, the duct 2 is aligned transversely with respect to the cylinders 3-6 and to the pistons 7-10 and leads in each case transversely into the cylinders 3-6 in the area of their largest cross-section.

Figure 4:
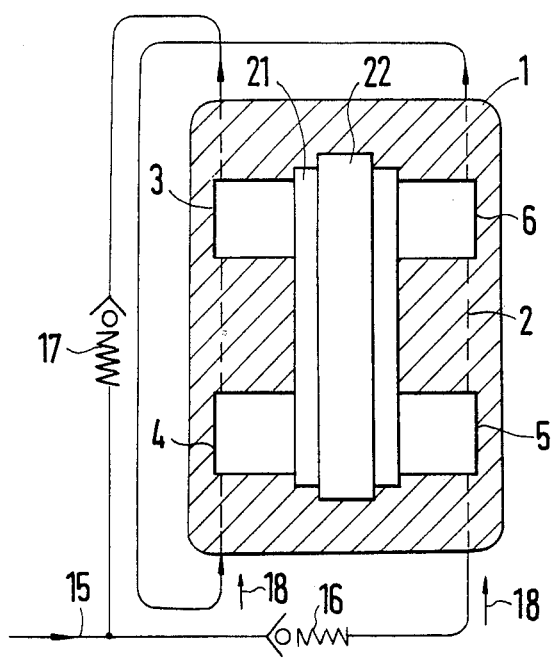
FIG. 4 is another preferred embodiment of a disk brake of the present invention.
Figure 5:
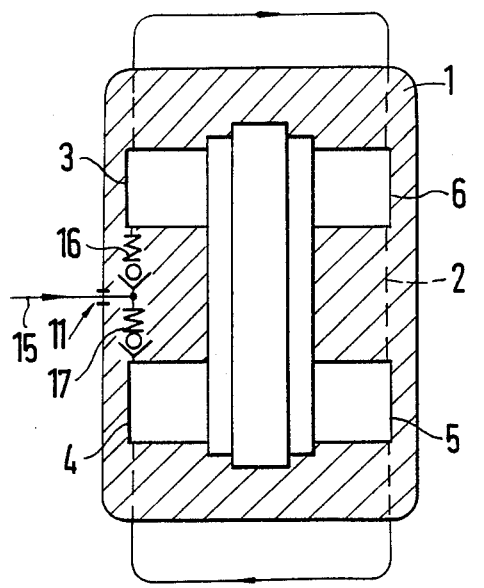
FIG. 5 is another preferred embodiment of a disk brake of the present invention.
Figure 6:
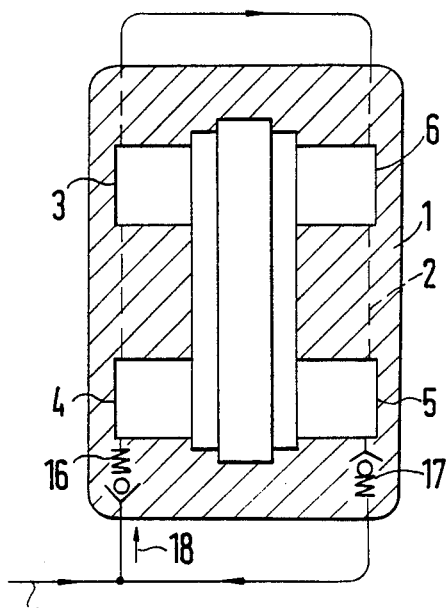
FIG. 6 is still another preferred embodiment of a disk brake of the present invention.

In FIG. 4, a preferred embodiment of a disk brake having a brake caliper 1 is shown, the ducts 2 of which, in each half of the caliper 1, are passed through by a flow in the same flow direction. In contrast, in the embodiment of FIG. 1, an opposed flow direction occurs in each caliper half. Shown in FIGS. 5 and 6 are other preferred embodiments of disk brakes, these embodiments having valves 16 and 17 that are arranged on the inside of the caliper 1. The inlet opening 11 in the duct 2 is arrangeable at any arbitrary point of the duct 2.

As seen in the embodiment of FIG. 1, from a joint hydraulic supply pipe 15, the brake fluid, via a first check valve 16 and a supply pipe 12, is guided through the inlet opening 11 into the duct 2. From here, it is guided through the cylinders 3 and 4, into the cylinders 5, 6 via the U-shaped connecting pipe 2a, and then through the opening 13 into the outlet pipe 14. Before this outlet pipe 14 leads into the supply pipe 15, a second check valve 17 is inserted. The check valves 16 and 17 are constructed identically, but are installed in opposite shutting direction with respect to one another. The outlet pipe 14a that is connected behind the second check valve 17 leads into the joint supply pipe 15 in front of the first check valve 16 with respect to the flow direction 18.

When the brake is actuated, brake fluid from a storage device 19 is fed to the duct 2 by a master brake cylinder 20, via the supply pipe 15 of the pipe 16. The first valve 16 opens automatically because of the applied pressure, while the second valve 17 remains shut. The cylinders 3-6 fill up with brake fluid, and the pistons 7-10 are pressed against brake shoes 21, that in turn place themselves against a brake disk 22.

When the brake is released, the pistons 7-10 again place themselves in their initial position, seen in FIG. 1. The brake fluid is pressed from the cylinders 3-6 into the duct 2 and via these cylinders 3-6, the whole volume of the brake fluid that was originally present in the cylinder spaces is pressed into the pipes 14, 14a as well as partially into the supply pipe 15, through the outlet opening 13 in the direction of the arrow 23, when the valve 17 is opening. In these exterior pipes 14, 14a and 15, a partial cooling of the heated brake fluid will then take place. When braking takes place again, cooled brake fluid is fed into the cycle of the brake into the caliper.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A hydraulically controlled disk brake of a motor vehicle having a plurality of hydraulically actuable brake pistons that are arranged in a caliper and are guided in a plurality of respective cylinders, said brake comprising:
   duct means for continuously and serially leading brake fluid from an inlet to a first of said plurality of cylinders and on to the last of said plurality of cylinders and from there to an outlet opening; and
   first and second check valve means for said inlet and said outlet openings, one said check valve means being arranged in front of said first cylinder and another said check valve means being arranged behind said last of said cylinders.

2. A disk brake according to claim 1, wherein said inlet opening and said outlet opening are directly adjacent to said first cylinder and said last cylinder.

3. A disk brake according to claim 2, wherein said duct means, between a last said cylinder of a first caliper half and a first said cylinder of a second caliper half in flow direction, has a U-shaped connecting pipe that is outside said caliper.

4. A disk brake according to claim 3, wherein said duct means is arranged in an approximately horizontal central plane of said piston and extends transversely to said cylinders and leads into said cylinders in an area of a largest cross-section of said cylinders.

5. A disk brake according to claim 4, further comprising joint hydraulic supply pipe means that has branching-off inlet pipe means and outlet pipe means, said outlet pipe means leading into said joint supply pipe means in front of said first check valve means with respect to said flow direction, said hydraulic supply pipe means being connected to said duct means.

6. A disk brake according to claim 5, wherein said first check valve means is arranged in said inlet pipe means such that said first valve check means opens up by means of brake pressure in said joint supply pipe means, and said second check valve means is arranged in said outlet pipe means such that said second check valve means shuts by means of brake pressure in said joint supply pipe.

7. A disk brake according to claim 6, wherein said duct means connects all said cylinders with one another such that brake fluid of pressure spaces in said cylinders from said brake pistons is fed to said outlet pipe means and said hydraulic supply pipe means when said brake is released.

8. A disk brake according to claim 1, wherein said cylinders of each said half said caliper have duct means through which brake fluid is guided in the same flow direction.

9. A disk brake according to claim 1, wherein at least one of said check valve means are within said caliper.

10. A disk brake according to claim 1, wherein said duct means has the inlet between said cylinders.

* * * * *